Nov. 18, 1969　　　A. K. LITTWIN ET AL　　　3,478,876
MAGNETIC PARTS SORTER
Filed Jan. 12, 1965　　　　　　　　　　　　4 Sheets-Sheet 3
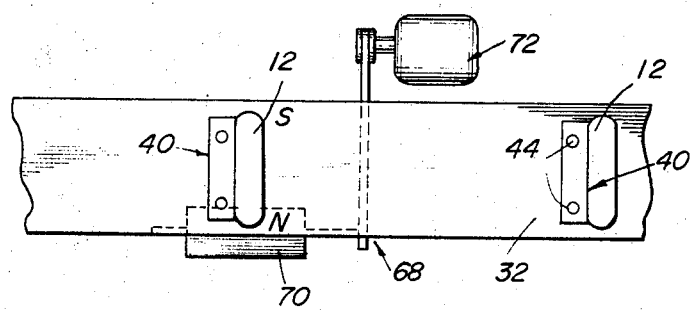
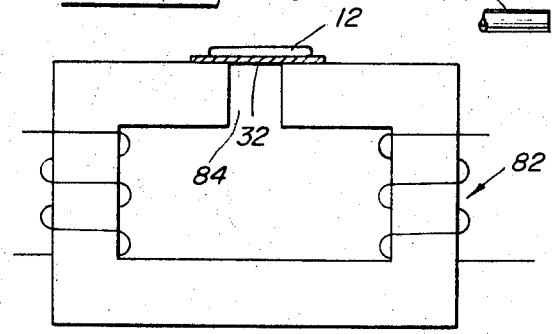
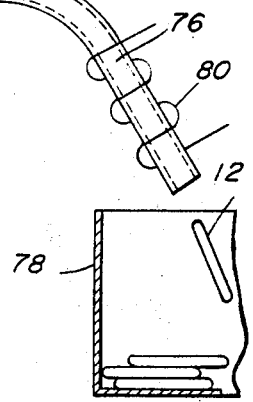
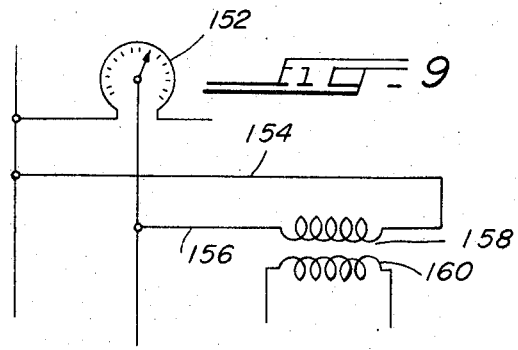
INVENTORS.
ARTHUR K. LITTWIN
DONALD F. LITTWIN
BY

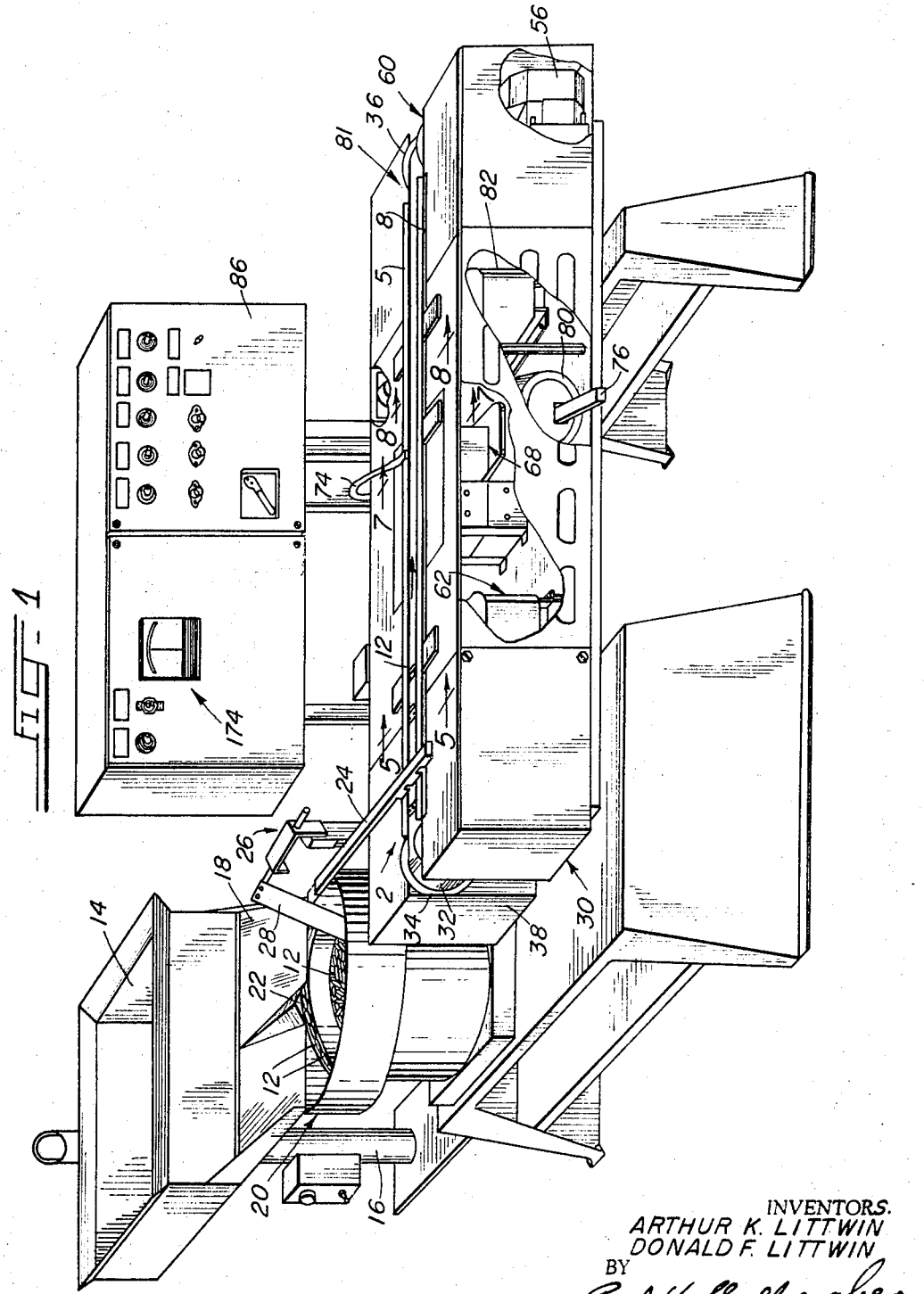

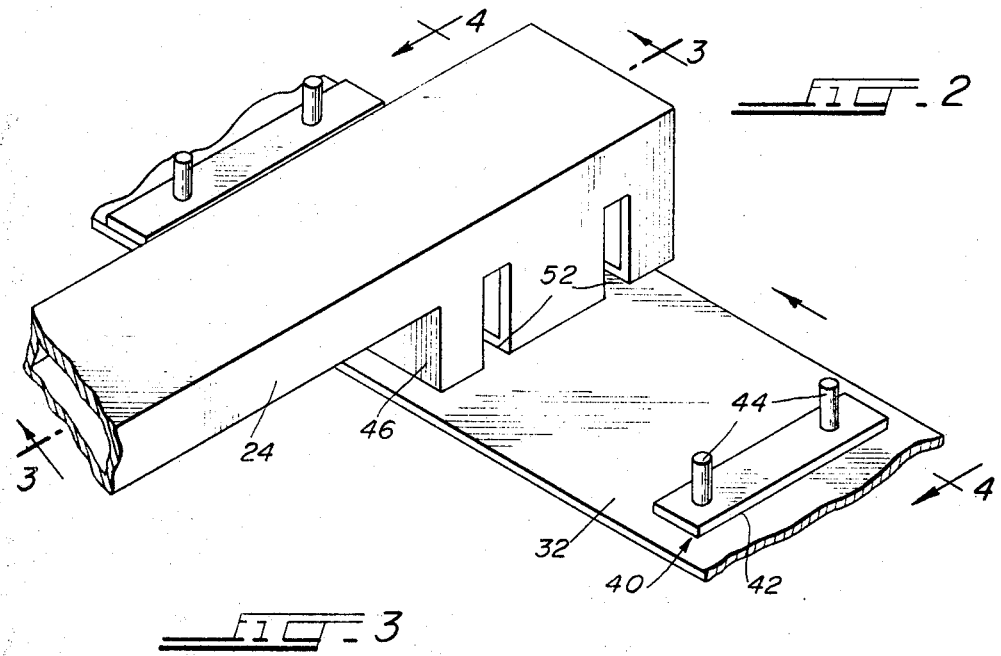
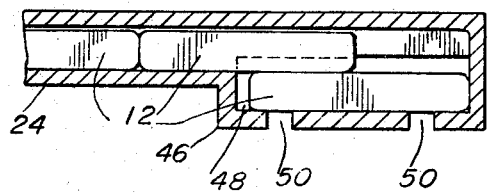
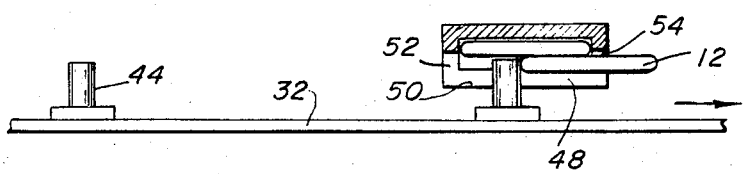
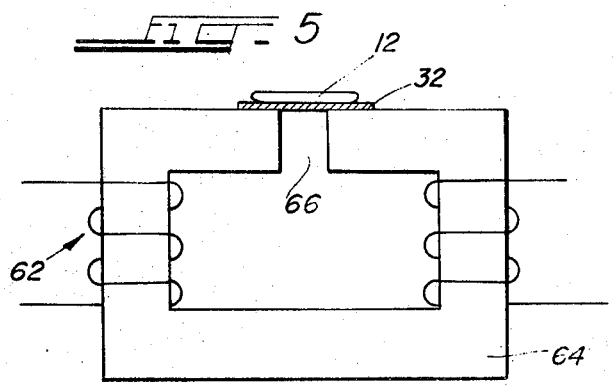

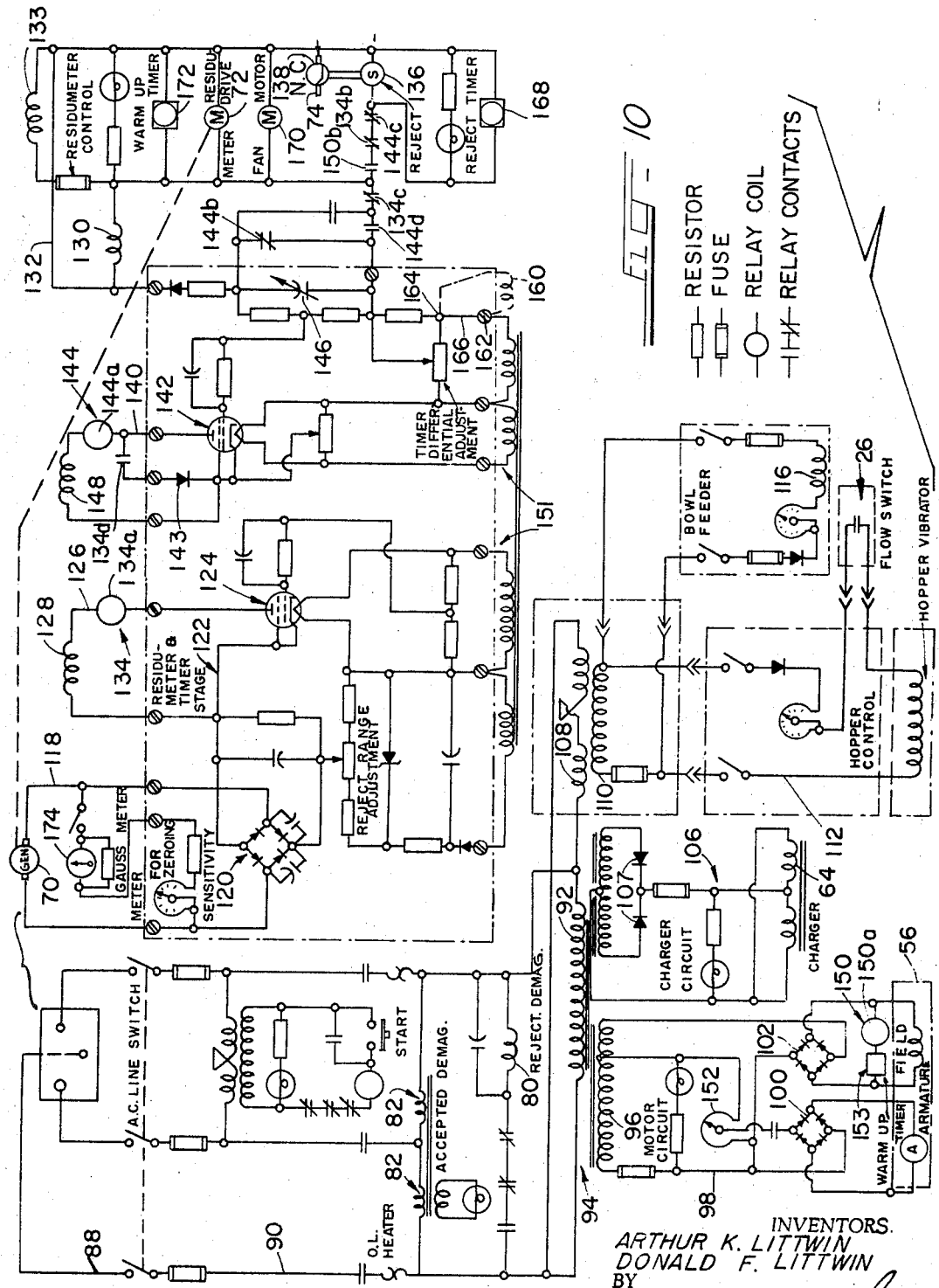

United States Patent Office 3,478,876
Patented Nov. 18, 1969

3,478,876
MAGNETIC PARTS SORTER
Arthur K. Littwin, Lincolnwood, and Donald F. Littwin, Chicago, Ill., assignors to Arthur K. Littwin, Robert L. Littwin, Donald F. Littwin and Horace A. Young, trustees of Littwin Family Trust No. 1
Filed Jan. 12, 1965, Ser. No. 424,912
Int. Cl. B07c 5/34; G01r 33/00
U.S. Cl. 209—73
11 Claims

ABSTRACT OF THE DISCLOSURE

Magnetizable articles are sorted according to the degree of magnetization of the articles. The articles are conveyed along a path at a controlled speed, magnetized at a station along the path, and then evaluated for level of magnetism at a subsequent testing station. The articles are subsequently sorted in accordance with the testing.

The present invention relates to a magnetic parts sorter.

The apparatus of the present invention is particularly adapted to sorting magnetizable pieces according to the degree of magnetization of the pieces, and is arranged so that it can eject either those having magnetism above a predetermined degree or below a certain degree, selectively. In the present instance the apparatus disclosed is arranged for ejecting those parts having a magnetism below a certain desired level.

As is known magnetizable and magnetized parts are used in various ways in industry. For example in certain kinds of speedometers a small metal part is used as a rotor. It is necessary for the proper functioning of the speedometer that this part be magnetized to a certain degree in order to cause movement of another part intended to be moved thereby.

A principal object of the present invention is to provide novel apparatus arranged for accommodating magnetizable parts of the character mentioned, which are preferably not magnetized, but the apparatus in its operation fully magnetizes the parts, then tests them, rejects the undesired parts, which in the present instance are those below a certain degree of magnetism, and then demagnetizes all the parts, both those accepted, and those rejected.

Another object of the invention is to provide apparatus of the foregoing general nature having a novel arrangement for automatically feeding the parts into and through the apparatus along the instruments for performing the necessary operations in connection with the parts.

Another object is to provide apparatus of the general character indicated, having a novel arrangement for performing an ejecting function, and in which the ejecting phase of the apparatus is shut off when an acceptable part is involved, so that in the event of malfunction of any portion of the apparatus, the apparatus will fail safe.

A further object is to provide magnetic parts sorting apparatus having a novel time delay arrangement to hold the apparatus in condition according to the test of each part, between successively conveyed parts, so as to avoid functioning of the apparatus in connection with a predetermined part as controlled by any other part.

Still another object of the invention is to provide a magnetic parts sorter of the foregoing general character, having a conveyor for successively conveying the parts to be tested and sorted, and in which the novel time delay arrangement mentioned is incorporated, and wherein a further feature is incorporated in that the time delay arrangement is directly controlled by the conveyor and is varied according to the speed of the conveyor, the conveyor itself being manually variable in speed.

Other objects and advantages of the invention will appear from the following detailed description taken in conjunction with the accompanying drawings in which;

FIGURE 1 is a perspective view of the apparatus of the present invention with portions of the outer shell broken away, showing portions of interior instrumentalities;

FIGURE 2 is a fragmentary perspective view taken in the direction of the arrow 2 of FIGURE 1, from the left and above;

FIGURE 3 is a sectional view taken at line 3—3 of FIGURE 2;

FIGURE 4 is a sectional view taken at line 4—4 of FIGURE 2;

FIGURE 5 is a semi-diagrammatic view of the magnetizing coil of the apparatus, and oriented according to line 5—5 of FIGURE 1;

FIGURE 6 is a semi-diagrammatic view of the test instrument of the apparatus and oriented approximately according to the arrow 6 in FIGURE 1;

FIGURE 7 is a semi-diagrammatic view of a portion of the apparatus including the ejecting stage and oriented according to line 7—7 of FIGURE 1;

FIGURE 8 is a diagrammatic view of the coil for demagnetizing the accepted parts and oriented according to line 8—8 of FIGURE 1;

FIGURE 9 is a detail of an electrical circuit that may be incorporated in the main circuit of FIGURE 10, in an alternative arrangement; and FIGURE 10 is a diagram of the main electrical circuit used in the apparatus.

Referring now in detail to the accompanying drawings attention is directed first to FIGURE 1 showing the apparatus as a whole, and having portions broken away to show certain internal instrumentalities. The parts to be tested and sorted are indicated at 12, each being, in the present instance, a small flat steel piece in the neighborhood of an inch long and one-fourth inch wide, but it will be understood that the apparatus is adaptable to virtually any size piece within practical limits.

As indicated above, the part or piece 12 is a rotor to be used in speedometer of known type and in accordance therewith is to have a predetermined degree of magnetism for turning another element in the speedometer, by means of that magnetism. Accordingly the parts must be capable of becoming magnetized to that desired degree in order to function properly, and any part that is incapable of becoming so magnetized must be rejected. The apparatus of the present invention, according to the following disclosed embodiment is operative for testing such parts according to their capability of becoming so magnetized, accepting the good parts and rejecting the bad parts. It is however to be understood that the apparatus is operative for operating in a converse manner, namely accepting parts that are not magnetized, or magnetized below a predetermined level, and rejecting parts magnetized above that level.

The apparatus includes a hopper 14 into which a quantity of the parts to be sorted are introduced. This hopper is supported by a suitable stand 16 and is arranged for being vibrated for feeding the parts therefrom. The vibrating means is of known type and need not be described herein, but the electrical means for controlling the vibrator is incorporated in the electrical circuit of FIGURE 10 as pointed out below.

The parts are fed from the hopper 14 through a chute 18 into a bowl feeder 20 vibrated in such a manner that the parts 12 are fed upwardly along a spiral ramp 22. The character and function of this feeder are known and need not be described herein but in this instance also the electrical means for controlling this feeder is incorporated in the main electrical circuit of FIGURE 10. The parts are fed from the ramp 22 through a chute 24 in a manner to be described in detail hereinbelow. A flow switch 26 is provided for controlling the flow of the parts from the hopper 14 into the feeder 20. This switch 26 is of known construction and the arrangement includes an arm 28 extending into the feeder 20 where its extended and free end rests on the quantity of parts on the bottom of the feeder 22. When the quantity of parts in the feeder is sufficiently high, the arm 28 shuts off the switch and stops the vibration of the hopper 14, and when the height of the parts in the feeder recedes, the arm closes the switch and initiates vibrations.

The chute 24 extends over that part of the machine which may be considered a main operating component and designated 30. This component 30 includes a conveyor belt 32 of suitable character being made of, for example, plastic and is of suitable width to accommodate the parts to be treated. The belt is mounted on pulleys 34 and 36 suitably mounted in the frame 38. The belt is provided with a plurality of cleats 40 each of which in the present instance includes a base 42 which may be of rectangular shape and may also be of suitable plastic and secured to the belt in a suitable manner such as by cementing. Extending upwardly from the base 42 are a pair of pins 44 spaced apart along the length of the cleat and transversely of the belt. The pins may be secured in any suitable manner and may be of any suitable material such as steel. These cleats are spaced along the belt at suitable distances according to the intended capacity of the machine taking into consideration the speed of the belt, in the present instance being spaced on the order of four inches.

The chute 24 for the main part is a rectangular tube having at its outer end a downwardly extending portion 46 forming a recess or cell 48 having a bottom element 50, the parts dropping into this cell as they move outwardly through the chute. This cell 48 is slightly longer than the length of one part. The chute at the leading side considering the direction of movement of the conveyor belt (the upper run running from left to right as viewed in FIGURE 1) is provided with a pair of notches 52 for receiving the pins 44, these notches continuing as slots through the bottom element 50 of the cell. On the opposite side of the cell 48, the side wall is open at the lower portion as indicated at 54 to enable the part to be ejected therefrom by the pins 44. As the conveyor progresses in the direction indicated, the pins 44 enter the notches 52, engage the part 12 in the cell 48, and force it through the open side 54 and it drops onto the conveyor ahead of the cleat.

The conveyor belt 32 is driven by any suitable means such as an electric motor 56 (FIGURE 1, right) through any suitable and known drive, preferably a variable speed drive. The belt run at the top of the machine is guided by side guides 58 which may be angle pieces running along the length of the belt. The frame 38 of the machine as will be noted is divided longitudinally, providing a space 60 for accommodating the belt. The upper run of the belt is disposed in or adjacent the top of the space 60 so as to be closely adjacent certain of the instrumentalities contained in the machine and referred to again hereinbelow. The exact physical and mechanical construction of the parts need not be described in detail so long as the functional relation is provided as described hereinbelow.

As the parts are carried by the conveyor from the chute 24 they pass over a magnetizer or "charger" 62 which is shown diagrammatically also in FIGURE 5. This magnetizer includes a D.C. coil 64 and a core having a gap 66 immediately under the top run of the belt 32. One of the parts 12 to be sorted is shown in FIGURE 5 on the belt and over the gap 66 where it will be seen that it is closely adjacent the gap and upon energization of the coil 64 the flux readily passes through the part 12 and magnetizes it.

The belt carries the parts next to the testing station indicated by the arrow 6 and which includes a testing instrument 68 which is shown diagrammatically in FIGURE 6. This instrument includes a generator armature 70 suitably mounted for rotation and driven by a motor 72. The armature 70 is disposed adjacent one side of the belt and the part 12 to be tested has one end adjacent the side edge of the belt and over the generator armature. The magnetized part 12 being polarized, the arrangement provides for only one pole to pass over the armature. If the part is magnetized to the desired degree, a control function is performed as described in detail in connection with the circuit of FIGURE 10, but briefly, it passes by the ejecting station (FIGURE 7) without being ejected, this station being immediately posterior to the testing station. If the magnetism of the part is not up to the desired level, it is ejected at the ejecting station, by means of an air stream issuing from an air line 74 which blows the part 12 from the belt into a chute 76 through which it passes into a suitable receptacle 78. The presence of the air stream is controlled by the condition of magnetization of the part, as described in detail hereinbelow in connection with the circuit of FIGURE 10. An A.C. coil 80 surrounds the chute 76 and is operative for demagnetizing the parts as they pass through the chute. The generator armature 70 represents an instrument known in the trade as the "Residumeter," put out by Electro-Matic Products Co., Chicago, and used for testing and gauging the level of magnetism of magnetic articles.

If the part is not ejected at the ejecting station in (FIGURE 1), it passes on to a demagnetizing station 81 where a demagnetizing coil 82 is provided, as shown diagrammatically in FIGURE 8. This coil is similar to that of FIGURE 5 but, as noted above, is of A.C. character and serves to demagnetize the parts 12 as they pass over the gap 84 in the coil. The parts 12 then drop off the remote delivery end of the belt into a suitable receptacle.

Included in the apparatus is an instrument panel or box 86 which includes certain indicating lights and other indicators included in the circuit of FIGURE 10.

Attention is now directed to the electrical circuit of FIGURE 10. An A.C. line source 88 leads to a circuit 90 which includes the primary 92 of a transformer 94. One secondary 96 of the transformer is incorporated in a circuit 98 which includes rectifiers 100 and 102 for driving the D.C. motor 56 which drives the conveyor belt 32.

The transformer 94 includes another secondary 104 included in a circuit 106 which incorporates the coil 64 indicated in FIGURE 5 and incorporated in the magnetizer 62 of FIGURE 1. This circuit also includes rectifier means 107 for providing D.C. to the coil 64.

Connected across the lines of the circuit 90 is the coil 80 of the demagnetizer of FIGURE 7, for demagnetizing the rejected parts. Also connected across the lines of the circuit 90 is the coil 82 indicated in FIGURE 8 and incorporated in the demagnetizing means 82 of FIGURE 1.

The transformer 94 includes another primary 108 and a secondary 110 included in a circuit 112 which includes the flow switch 26 and a coil 114 utilized for vibrating the hopper 14. The circuit 112 also includes a coil 116 for vibrating the bowl feeder 20.

The generator armature 70 of FIGURE 6 is shown in FIGURE 10 (top, left of center) driven by the motor 72 (far right). The generator armature 70 is included in an A.C. circuit 118 leading to a rectifier 120 providing D.C. in a circuit 122 which in turn controls the bias on an electron tube 124. The tube 124 is included in a circuit 126 which also includes a secondary 128 of a transformer the primary of which is shown at 130. The primary 130 is included in a circuit 132 which also includes a coil 133 (top, far right) set up as a secondary to the primary 92 in the transformer 94. The secondary 133 feeds the coil 130 and thus provides the power to the secondary 128. Negative bias is normally imposed on the tube 124, holding the circuit 126 open, and when a magentized part 12 passes by the armature 70, D.C. bias is imposed on the tube and renders it conducting and closes the circuit 126, in a manner described in detail hereinbelow.

A relay 134 has a coil 134a in the circuit 126 which controls normally closed switches 134b and 134c, the former controlling a solenoid 136. The solenoid 136 controls a normally closed valve 138 interposed in the airline 74 leading to the ejector means of FIGURE 7. When this valve is opened, which is done pursuant to energization of the solenoid 136, air is permitted to flow through the line 74 and blow any part off of the conveyor that happens to be there at the time.

Provided also in the main circuit is a time lapse control circuit indicated at 140 (top, center) which includes an electron tube 142. This circuit also includes a normally open switch 134d included in the relay 134 and closed upon energization of the coil 134a. The switch 134d is in series with a rectifier 143 for providing positive D.C. bias on the tube 142. Also in the circuit 140 is a relay 144 including a coil 144a which controls a normally closed switch 144b (right) connected parallel with a variable condenser 146. The circuit 140 is energized by another secondary 148 (top, center) which is powered by the primary 130. The coil 144a controls other switches namely a normally closed switch 144c (center, right) for controlling the solenoid 136, and a normally open switch 144d. Negative bias is normally imposed on the tube 142 rendering it non-conducting and holding the circuit 140 open, but it is rendered conducting under the control of the switch 134d and condenser 146 whereupon the circuit is closed, in a manner described in detail hereinbelow.

A relay 150 (lower left) is included in the circuit of the motor 56, including a coil 150a and a normally open switch 150b (far right) for controlling the solenoid 136. This relay is controlled by a "warm up" timer 153 in series therewith. Other secondaries, indicated generally at 151 (center), of the primary 130 provide various controls of the tubes 124 and 142, and the condenser 146.

In the normal operation of the apparatus, a condition is first assumed according to the condition of the circuit as shown in FIGURE 10. The switch 150b (far right) is normally open, the solenoid 136 is de-energized, and the valve 138 is in its normally closed position. Shortly after the apparatus is turned on, the warm-up timer 153 (lower left) turns on the relay 150 which closes the switch 150b, energizing the solenoid and opening the valve.

When a part to be tested is being conveyed along the conveyor, it is magnetized above a predetermined level by the magnetizer 62, or not, according to whether it is a good or bad part. In the present assumed example of the embodiment of the invention, the following description is of the control functions developed in response to a good part. A description of the control functions in the case of a bad part will be made hereinbelow. When a good part so magnetized passes by the generator armature 70, a voltage is developed thereby which produces a current that is converted to D.C. by the rectifier 120, as indicated above, and thereupon a positive bias is imposed on the tube 124, rendering it conducting, closing the circuit 126 energizing the coil 134a in the relay 134.

Energization of the coil 134a closes the switch 134d and positive bias is imposed on the tube 142 which renders it conducting and closes the circuit 140. Thereupon the coil 144a of the relay 144 is energized which opens the switch 144b and closes the switch 144d. The condenser 146 at this point is in fully charged condition, and upon closing the switch 144d the charge thereof produces a positive bias on the tube 142 and maintains the tube in conducting condition until the charge is dissipated, as explained more fully hereinbeow.

The part to be tested remains in operative relation to the armature generator 70 for only a short period of time, passing out of the effective range thereof quite rapidly. For example the cleats on the conveyor, and thus the parts, are spaced apart, in one practical embodiment of the invention, four inches and the magnetized part remains in the effective range of the generator armature for about one-fourth to one-third of that distance or cycle, or in the neighborhood of an inch to an inch and a third of the linear travel of the conveyor. If reliance were placed on the circuit 126 the control would become ineffective in that short portion of the travel of the conveyor, but due to the time lapse circuit 140 this control can be maintained throughout the complete period between parts, and therefore constantly in the travel of the conveyor. A great advantage in this arrangement, and a principal feature of the invention, resides in the fact that the successive parts being tested can be made to be effective for performing a control function and then quickly moved out of the range of the effectiveness of that control, and the control then continued by other control means such as the circuit 140.

Upon energization of the circuit 126 and consequent energization of the coil 134a, the switch 134b is opened, de-energizing the solenoid 136 which permits the valve 138 to close. In response to the energization of the circuit 140, which takes place immediately upon energization of the circuit 126, the switch 144c is opened to continue the de-energization of the solenoid 136 after closing of the switch 134b in response to de-energization of the circuit 126 which takes place promptly.

The variability of the condenser 146 enables the control bias to be imposed on the tube 142 for the desired period of time between successive parts being tested. In practical working conditions the condenser is adjusted to a condition wherein the charge remains thereon and its control is effective thereby throughout a period less than the time interval represented by the spacing of the cleats on the conveyor i.e., the period is of such duration that the charge on the condenser will not have been dissipated by the time a voltage is developed by the succeeding magnetized part. However if the succeeding part to be tested is not a good part, the charge on the condenser will have been dissipated after, but only slightly after, that bad part passes into the normal range of effectiveness of the generator armature. As a consequence the tube 142 will become non-conducting, opening the circuit 140 and enabling the switch 144c to close, energizing the solenoid 136, and thereby opening the valve 138 and permitting the air to be forced through the line 74 and blow the bad part off of the conveyor. It will be understood that the condenser is varied according to the spacing of the cleats on the conveyor, and the speed of the conveyor as well as possibly other factors. It will be understood that the charge on the condenser is built up rapidly, or in a small fraction of the time in which it is dissipated.

When a part passes through that is not magnetized to the desired and predetermined level, the voltage developed thereby is insufficient for rendering the tube 124 conducting, and consequently both circuits 126 and 140 remain open and the switches 134b and 144c remain closed. The solenoid 136 therefore remains energized, holding the valve 138 open, and allowing the air blast to be delivered through the line 77. A timer 168 (far right, FIGURE 10) is interposed for shutting off the air supply, after a predetermined period of time in the event, for example, that all of the parts have been conveyed through and the feeder is empty, or if the parts should jam and none are being fed through etc.

A fail safe feature is provided by the arrangement whereby if no parts 12 are being conveyed, or if stray foreign pieces should fall onto and be carried by the conveyor, the solenoid 136 remains energized, opening the valve 138 and permitting an air blast to be delivered to blow off all items on the conveyor.

It may be desired to provide automatic variation of the condenser 146 corresponding to the rate of speed of the conveyor. Such an arrangement is shown in FIGURE 9. The drive motor 56 is provided with a manual control 152 (see lower left of FIGURE 10 and see also FIGURE 9). Leads 154 and 156 therefrom are connected with a primary coil 158 in a transformer which also includes a secondary coil 160. This secondary 160 may be connected in the circuit of FIGURE 9 (see right end of FIGURE 10) as shown in dot-dash lines. The coil may be connected across terminal points 162 and 164, and the conductor 166 between these points eliminated. Then upon manual setting of the control 152, voltage corresponding to that setting is developed in the coils 158 and 160, with consequent varying charge imposed on the condenser 146. For example if the speed of the conveyor is increased, the condenser 146 will be set to discharge in a shorter period, and conversely, if the conveyor is slowed down, the condenser 146 will be set to discharge over a longer period of time.

Other instrumentalities may be included in the circuit for practical purposes, and are not essential to the present invention. For example a cooling fan may be provided, the motor for which indicated at 170 (far right). Also a warm-up timer 172 may also be interposed in the circuit. Various signal lights are shown in the circuit and these as well as other indicators are mounted on the panel or box 86, as indicated above.

It may be desired to utilize a gauss meter 174 (top center), this meter also having an indicator mounted on the panel 86. This meter is normally out of circuit, but it may be manually thrown in circuit for enabling the operator to observe, in a sampling operation, the condition of the parts going through the machine.

In accordance with the reverse character of operation of the apparatus, as stated above, the control circuits 126 and 140 and solenoid 136 and valve 138 could be arranged to eject a part having magnetism above a predetermined level, and remain inactive in connection with a part having magnetism below that level.

We claim:
1. A method of treating discrete magnetic articles, comprising the steps of conveying the articles singly and successively along a path at a predetermined controlled speed, magnetizing the articles in polarized condition with a uniform magnetizing force at a first station along the path, testing the level of magnetism in each article at a testing station posterior to the magnetizing station, the testing step including moving the articles along a generator armature in such a manner that only one pole passes thereby, and the generator armature, by utilizing the magnetic flux of the articles, generates A.C. voltage therefrom, and as an additional step utilizing the current produced by the voltage for controlling means for rejecting articles from the path according to the degree of magnetism in the articles.

2. Apparatus of the character disclosed, comprising a conveyor for supporting magnetic articles and conveying them at a predetermined controlled speed along a path and having a delivery end at which articles are normally delivered from the conveyor, means at a first station along the path for uniformly magnetizing the articles for a predetermined period according to the speed of the conveyor, means at a second station along the path for testing the level of magnetism in the articles, means at a third station along the path for ejecting articles from the conveyor, means controlled by each magnetic article for activating the ejecting means according to the degree of magnetism of that article, means at the ejecting station for demagnetizing articles ejected thereat, and means adjacent the conveyor posterior to the third station for demagnetizing articles not ejected and conveyed past that station.

3. Apparatus set out in claim 2 and including means for feeding magnetic articles successively and singly, and in spaced relation to each other, to a position adjacent the conveyor, and the conveyor is operative for removing the magnetic articles successively, singly, and in spaced relation to each other, from the feeding means.

4. Apparatus set out in claim 3 including means for feeding magnetic articles successively to a position adjacent the conveyor, wherein the feeding means includes a chute a terminal portion of which extends over the conveyor and has a cell arranged for successively receiving the articles as they progress through the chute, said cell has notches and slots therein extending in the direction of the movement of the conveyor and an opening on the posterior side relative to movement of the conveyor for enabling movement of the articles out of the cell, and the conveyor is provided with pins positioned for entering into said notches and slots and engaging a magnetic article in the cell and removing it from the cell for enabling the article to drop on the conveyor ahead of the pins.

5. Apparatus set out in claim 2 and including a control circuit having two stages, the first stage being momentary in its effectiveness, and operative for conditioning the second phase, means is provided for retaining the second phase in its said condition for a prolonged period of time, and means is also provided for adjustably controlling the duration of that prolonged period.

6. Apparatus set out in claim 5 wherein the means for adjustably controlling the duration of the prolonged period includes variable condenser means, means is provided for charging the condenser when the control circuit means is open, and the control circuit means when closed is operative for discharging the condenser means, the condenser means being operative for imposing positive bias on the second tube means.

7. Apparatus set out in claim 5 including a variable speed conveyor, and means responsive to speed of the conveyor for varying the duration of the prolonged period inversely to the speed of the conveyor means.

8. Apparatus of the character disclosed, comprising a conveyor for conveying magnetic articles along a path, means at a first station along the path for magnetizing the articles, means at a second station along the path for testing the level of magnetism in the articles, said testing means including a generator armature closely adjacent the conveyor whereby the magnetic articles on the conveyor pass closely adjacent the generator armature, and whereby the generator armature is operative for generating voltage of a value corresponding to the level of magnetism in each magnetic article, means at a third station along the path for ejecting articles from the conveyor and including circuit means, and means controlled by each magnetic article for impressing the said voltage generated by each article for thereby activating the ejecting means according to the degree of magnetism of that article.

9. Apparatus set out in claim 8 wherein the generator armature is disposed at a predetermined position transversely of the conveyor, and the conveyor includes means for conveying the magnetic articles thereon in such position that only one pole of each article passes adjacent the generator armature.

10. Apparatus set out in claim 9 wherein the ejecting means is normally in inoperative position, a solenoid is provided which when energized is operative for activating the ejecting means, a first circuit is provided for normally retaining the solenoid de-energized and consequently the ejecting means in inoperative position, and a control circuit is provided responsive to voltage developed by the generator armature in relation to each magnetic article for controlling the first circuit.

11. Apparatus set out in claim 10 wherein the ejecting means includes an air line and means for producing an air stream therein and directing it at a magnetic article on the conveyor for removing it therefrom, the air line includes a normally closed valve therein, the solenoid is operative when energized for opening the valve, the control circuit includes normally non-conducting tube means, and means is provided for imposing positive voltage on the tube means and rendering it conductive and thereby closing the control circuit and de-energizing the solenoid.

References Cited

UNITED STATES PATENTS

| 1,663,539 | 3/1928 | Bellinger | 209—81 X |
| 2,234,456 | 3/1941 | Schwarte | 209—81 X |
| 2,652,533 | 9/1953 | Lush | 324—47 |
| 2,858,018 | 10/1958 | Alexander | 209—74 |
| 2,444,751 | 7/1948 | Scott | 209—111.8 |

M. HENSON WOOD, JR., Primary Examiner

R. A. SCHACHER, Assistant Examiner

U.S. Cl. X.R.

209—74, 118; 324—34